June 15, 1954  J. YOUHOUSE  2,681,406
ELECTRIC FLATIRON CONTROL
Filed Sept. 29, 1950  2 Sheets-Sheet 1

Inventor
Joseph Youhouse
By Johnson and Kline
Attorneys

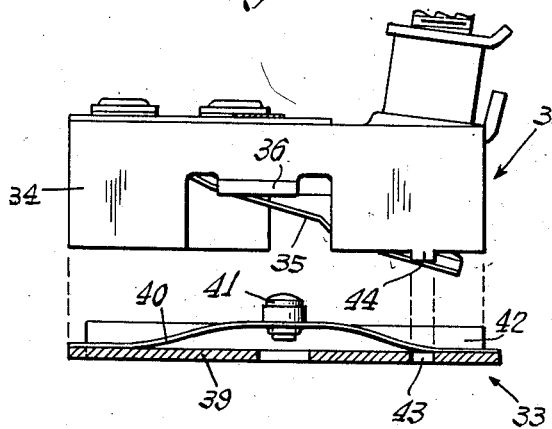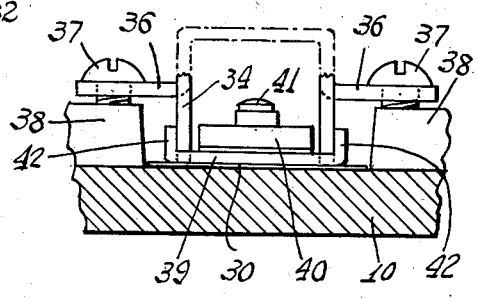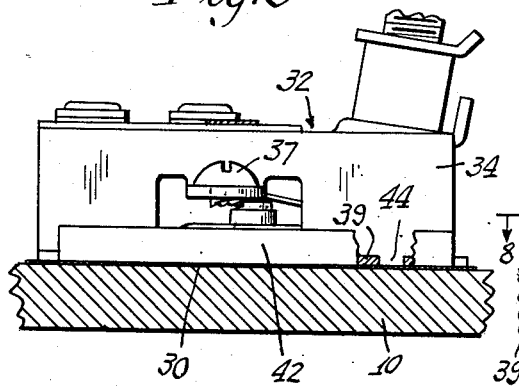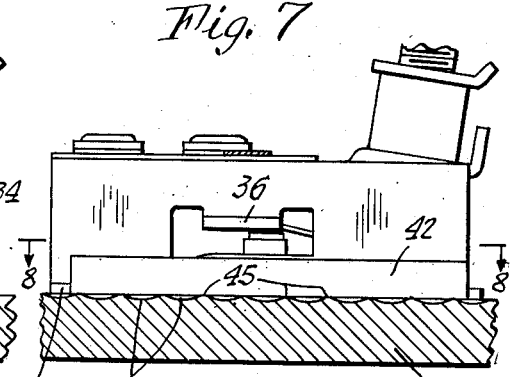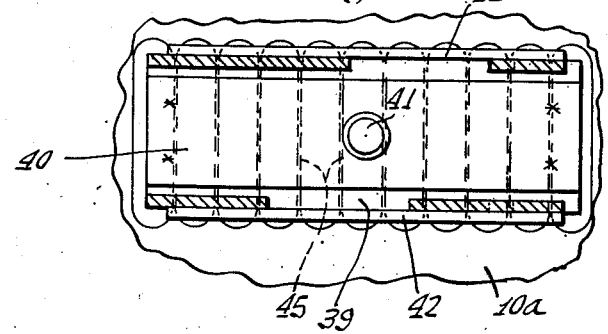

Patented June 15, 1954

2,681,406

UNITED STATES PATENT OFFICE 2,681,406

ELECTRIC FLATIRON CONTROL

Joseph Youhouse, Fairfield, Conn., assignor to Casco Products Corporation, Bridgeport, Conn., a corporation of Connecticut Application September 29, 1950, Serial No. 187,377

14 Claims. (Cl. 219—25)

This invention relates to thermostatically-controlled electrically-heated appliances such as flatirons and the like wherein it is desired to closely regulate the temperature of a sole plate or other heated member.

An object of the invention is to provide an improved appliance of the above type, in which the heated member is automatically held within a relatively small, desirable temperature range by repeated interruption of the heating circuit while at the same time the rate of interruption is held constant and is not excessive or undesirable. Stated another way, the object is to provide an appliance having a predetermined desired constant rate of make-and-break and having a relatively narrow, accurately held temperature range within which the heated member is held.

Another object of the invention is to provide an improved appliance with adjustable thermostatic control in accordance with the foregoing, which has relatively few parts and is extremely simple in construction, reliable in operation, and economical to fabricate and assemble.

The specific embodiment of the invention illustrated and described herein comprises a steam-electric, domestic flatiron. It should be understood, however, that the invention is not limited to a flatiron but applies also to other electrical appliances having heated members, such as waffle irons, percolators, etc.

Heretofore there has been a wide divergency in the results obtained from thermostatically-controlled electric irons, as regards the resulting temperature of the sole plate for any given setting of the thermostat, and the rate of interruption of the circuit to effect the control. Some electric irons having thermostats in which the high-expansion members are not integral with the low-expansion members along their lengths (bimetallic) hold the sole plate temperature within very close limits, for example within a 5 or 10 degree spread, but in accomplishing this the cycling of the thermostat is excessive, on the verge of fluttering.

Such rapid cycling is in the neighborhood of four to six times a minute, and is not particularly uniform, resulting in several drawbacks. To begin with, it decreases the useful life of the contacts substantially, because of the increased activity and cumulative effect of the arcing. The contacts become pitted much more rapidly and require servicing more frequently if the appliance is to remain in use. In addition, the relatively rapid rate of make-and-break and accompanying arcing results in increased radio and television interference.

Other electric irons having bimetallic thermostats are characterized by a cycle of greater period, that is, the rate of make-and-break is considerably less, being on the order of 40 or 50 per hour and being fairly constant or uniform. However, these irons do not have a particularly close temperature regulation of the sole plate, and a spread of 30 degrees or more is common.

If, in the prior irons using bimetallic thermostats, the thermostat design is altered to change the cycling to a value of one per minute which has been set up by the National Electrical Manufacturers Association as a desirable value, then the initial overshoot of the sole plate becomes excessive. The non-bimetallic thermostats cannot be redesigned to give a cycle of one per minute and hold the sole plate to a 20 degree spread in temperature. So far as I am aware, efforts to correct these difficulties by changes in the design and type of thermostat have been unsuccessful.

In accordance with the present invention I provide a novel organization of heated sole plate, thermostatic switch and heat-transfer control means which are so interrelated as to provide a highly desirable, narrow temperature spread for the sole plate of not more than 20 degrees with a make-and-break or cycling of one per minute. Thus I not only accurately control the sole plate temperature within relatively narrow limits, but reduce radio and television interference, and pitting of contacts and consequent shortened life of the thermostat by obviating a fluttering or rapid cycling. To my knowledge it has been impossible to accomplish this, without excessive initial overshoot, purely by thermostat design, regardless of the type of thermostat employed.

The thermostatic switch which I employ is of the type having heat-responsive means in the form of two sheet-metal strips disposed broadside to each other with only their ends rigidly secured together, one of the strips being bowed and of low-expansion metal and the other strip being relatively flat and of high-expansion metal. The high-expansion strip is disposed closely adjacent and broadside to the sole plate of the flatiron, with the heat-transfer control means of specified characteristics disposed between the strip and the body of the sole plate.

In one specific embodiment of the invention the heat-transfer control means comprises woven fiber glass ribbon, and I have found that such a ribbon of approximately .003" wall thickness will control the heat-transfer between the sole plate and thermostat to produce the above desirable result. The glass fibers engage the thermostat and sole plate at a large number of closely-spaced points, and the relation between the heat conductivity of the fiber glass and the thickness of the ribbon is such as to produce a time lag in the response of the high-expansion strip to changes in the sole plate temperature whereby a cycle of one per minute and a temperature spread of 20 degrees may be obtained. If instead a heat-insulating material having poorer heat conductivity than fiber glass were to be used, then the thickness of .003″ would have to be proportionately reduced.

In another embodiment of the invention the heat-transfer control means includes ribs or ridges formed on the upper surface of the sole plate and adapted to engage and support the thermostatic switch at a plurality of spaced points. The ridges provide for a relatively small area of contact between the thermostat and the sole plate, and provide for air space therebetween, resulting in a controlled transfer of heat from the sole plate to the thermostat.

I have found that by properly designing and constructing the ridges which are thus made to support the sole plate, the response of the thermostat to heating of the sole plate involves a time lag whereby cycling of one per minute may be obtained with a temperature spread closely approximating 20 degrees. Thus the heat-transfer control in this embodiment of the invention also involves a plurality of air gaps, and a plurality of points of contact between the sole plate and thermostat, having a relatively small area.

In effecting a simplification of the assembly of the thermostat I provide a novel structure comprising a heat-responsive unit and a switch unit actuated by the heat-responsive unit. On the switch unit I provide mounting lugs whereby it may be screwed to the sole plate of the flatiron. I also provide keying means in the form of small tongues, arranged to extend into slots in the heat-responsive unit, the latter being interposed between the switch unit and the sole plate. Accordingly when the switch unit is screwed to the sole plate with the heat-responsive unit interposed, the tongues and slots on said units will key them together and securely position the heat-responsive unit in place. Thus I avoid the necessity of welding or otherwise securing the two units together as was heretofore done.

Other features and advantages will hereinafter appear.

In the accompanying drawings:

Fig. 4 is an exploded side elevational view showing another embodiment of this invention.

Fig. 5 is a view like Fig. 4, but showing the thermostat assembled and secured to a sole plate.

Fig. 6 is a fragmentary end elevation of the thermostat and sole plate shown in Fig. 5.

Fig. 7 illustrates another embodiment of the invention, depicting an assemblage of thermostat and sole plate, the thermostat being in side elevation and the sole plate in vertical section, and Fig. 8 is a horizontal section taken on line 8—8 of Fig. 7.

Figure 1:
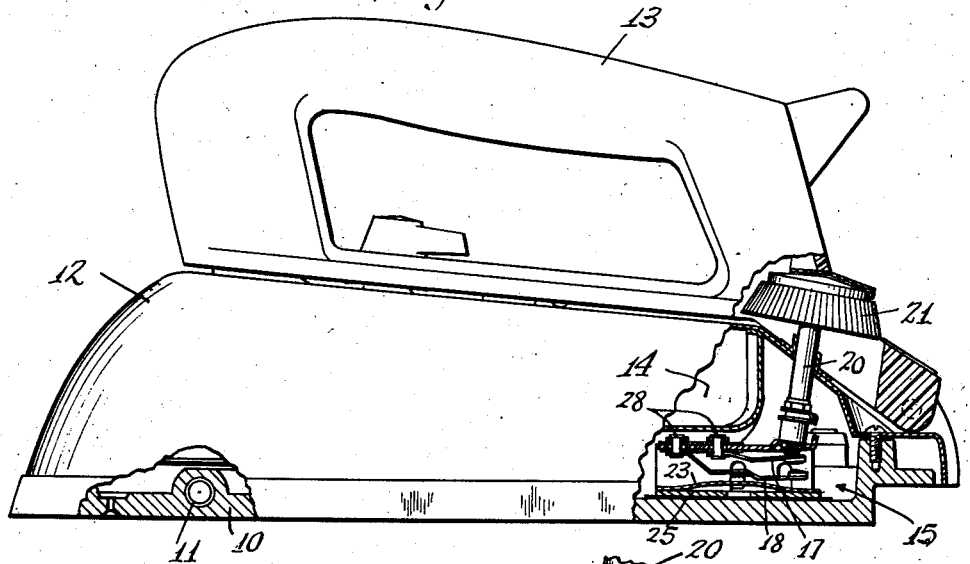
Figure 1 is a view partly in longitudinal vertical section and partly in side elevation of a flatiron having one form of improved thermostat control made according to the invention.
Figure 2:
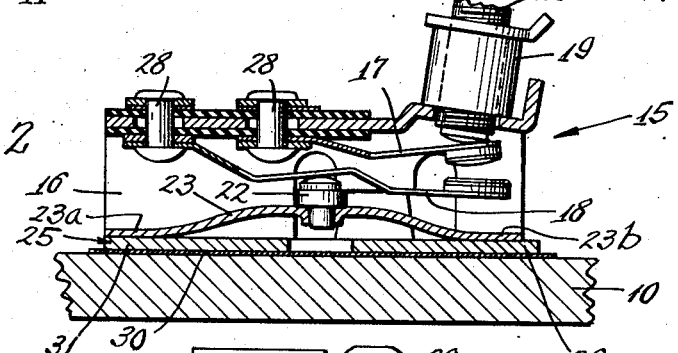
Fig. 2 is an enlarged detail, in vertical section, of the thermostat and sole plate shown in Fig. 1.

The flatiron shown comprises a sole plate 10 having a heating element 11, and having a casing 12 mounting a handle 13. Above the sole plate 10 a boiler 14 is provided, in heat-receiving relation with the sole plate.

At its rear the sole plate 10 carries a thermostatic switch 15 comprising a channel-shaped casing 16 mounting contact arms 17 and 18. The casing 16 has an upstanding threaded boss 19 carrying a thermostat adjusting shaft 20 having at its top end a knob 21.

Figure 3:
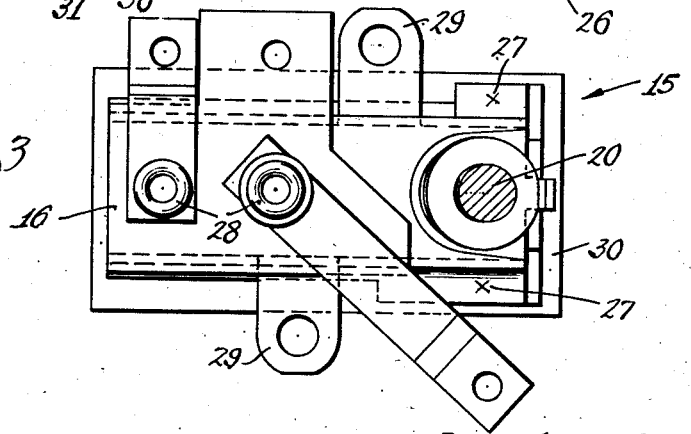
Fig. 3 is a top view of the thermostat of Figs. 1 and 2.

Actuation of the contact arm 18 is accomplished by an insulating button 22 carried by a bowed metal strip 23 of low-expansion metal, said strip having its ends 23a and 23b respectively secured to a substantially flat metal strip 25 of brass or other high-expansion metal. The strip 25 underlies the casing 16 and at one end 26 is welded to the casing at the places 27 in Fig. 3.

The contact arms 17 and 18 are carried by terminals 28, by means of which they are respectively connected in circuit with the heating element 11.

The casing 16 has apertured ears 29 to accomodate fastening screws (not shown) which are threaded into the sole plate 10 for the purpose of securing the thermostatic switch 15 to the sole plate.

In accordance with the present invention a heat-transfer control means is provided between the high-expansion strip 25 and the body of the sole plate 10 whereby an advantageous cycling of the thermostat is had, on the order of one per minute, together with a relatively close temperature spread of approximately 20 degrees. In accomplishing this, according to one embodiment of the invention, I provide a thin flat strip of heat insulation 30 which is interposed between the high-expansion strip 25 and the sole plate 10. I have found that by providing a heat-insulating strip 30 of interwoven glass fibers with a total thickness of approximately .003″, a time lag is introduced in the response of the high-expansion strip 25 to changes in temperatures of the sole plate 10, said time lag being of such a value as to advantageously alter the operation of the thermostatic switch to produce, as above stated, a make-and-break cycle of approximately one per minute and to maintain the sole plate temperature within a range of 20 degrees.

The operation of the thermostatic switch 15 were it to be mounted with the high-expansion strip 25 in direct contact with the sole plate 10 would result in a much more rapid make-and-break of the switch, on the order of 4 to 6 times a minute, and a corresponding narrowing of the temperature range of the sole plate to approximately a 5 degree spread. While the 5 degree spread is desirable, the high rate of make-and-break of the thermostat is a distinct disadvantage since it results in decreased life of the contacts and increased radio and television interference. Obviously, if a flatiron is used for a total time of say a thousand hours with the thermostat operating once per minute it would show considerably less deterioration of the contacts than if the thermostat were to cycle 5 or 6 times per minute for such a length of time. An acceptable standard cycle has been established in the industry, of one per minute. Using this as a basis, I have found that with my improved organization the sole plate can be maintained within a temperature range of 20 degrees. So far as I am aware this has not been possible with prior irons and thermostats, and I attribute it to the provision of the extremely thin heat insulation 30 which is interposed between the high-expansion plate 25 and the sole plate 10.

Since the high-expansion strip 25 is of different metal from the sole plate 10, the latter being usually cast of an aluminum alloy, these two parts will expand and contract at different rates, and consequently there will be relative movement between the end 31 of the strip 25 and the adjacent surface of the sole plate 10. Such relative movement together with the pressure existing between the strip 25 and the sole plate has an abrading action on the heat-insulating strip 30. I have found that such action is extremely detrimental to materials such as asbestos, and would result in fraying and deterioration of such materials. However, so far as I am able to discover, this abrading action has no detrimental effect on the woven fiber glass strip which I prefer to use at present, in the above embodiment.

While I do not wish this embodiment of my invention to be limited to the use of fiber glass insulation between the high-expansion member 25 of the thermostatic switch 15 and the sole plate, this particular type of insulation is extremely advantageous to use in the manner I disclose for the reasons that the strip may be made of the necessary minute thickness, on the order of .003" and still be handled without damage, and that fiber glass is resistant to the abrasive action resulting from relative movement between the sole plate and the heat-responsive member of the sole plate.

I also provide in accordance with this invention a novel thermostat construction whereby assembly of the switch part of the thermostat to the heat-responsive part is greatly simplified. In accomplishing this I construct the thermostat so that the said two parts are assembled to each other at the same time that the thermostat is secured to the sole plate, and as a consequence of such securement. Thus I eliminate, as such, the operation of securing together the two thermostat parts.

Referring to Figs. 4, 5 and 6, the thermostat shown comprises a switch part 32 and a heat-responsive part 33. The switch part 32 includes a channel-shaped housing or frame 34 carrying an actuatable switch contact arm 35. Intermediate its ends the frame 34 has a pair of outturned lugs or ears 36 provided with apertures to receive screws 37 which thread into bosses 38 in the sole plate 10. By this organization the frame 34 is secured in place on the sole plate.

The heat-responsive assemblage of the thermostat includes a high-expansion member 39 mounting a low-expansion member 40 which carries an actuating button 41 for engagement with the switch arm 35.

By the present invention the high-expansion member 39 has upturned flanges 42 extending along its opposite longitudinal edges, said flanges being spaced apart just sufficiently to receive between them the frame 34. Also, the high-expansion member is provided with a pair of slots 43 to receive tongues 44 carried by the thermostat frame 34 whereby the thermostat parts 32 and 33 are keyed together and prevented from shifting relative to each other.

In assembling the thermostat to the sole plate 10, the thermostat parts 32 and 33 may be easily fitted to each other as shown in Figs. 5 and 6 and then placed on the sole plate with the fiber glass ribbon 30 interposed, after which the screws 37 may be applied and tightened to securely hold the thermostat to the sole plate. The tongues 44 entering the slots 43 key together the thermostat parts and prevent relative movement, and the flanges 42 further insure against relative movement and facilitate fitting together the two thermostat parts.

Another embodiment of the invention is illustrated in Figs. 7 and 8. In this embodiment a novel heat-transfer control means is provided on the upper surface of the sole plate 10a. This heat-transfer control means comprises a plurality of transversely extending ribs 45 separated by shallow grooves 46, the ribs constituting the supporting means which is engaged by the high-expansion member 39 of the thermostat.

The ribs 45 and grooves 46 may be formed in the sole plate 10a in any suitable manner, as by milling or other machining operations, or they may be incorporated in the mold so that when the sole plate is cast it will have the ribs and grooves already formed in it.

I have found that the ribs 45 may advantageously be from .007" to .008" in width, that the grooves 46 may advantageously be $\frac{5}{32}$" wide and from .015" to .025" deep. Also the ribs may extend beyond the side wall of the thermostat for a distance of between .010" and .015", and that with such proportions it is possible to obtain a thermostat cycling of approximately one per minute while at the same time maintaining the sole plate temperature within a range of 20 degrees.

I do not wish to restrict myself to the exact sizes and shapes of ribs 45 disclosed herein, as the essential feature by which the transfer of heat is controlled to accomplish the result stated above resides in the use of limited relatively small areas of contact between the thermostat and the sole plate, in conjunction with means providing poor transmission of heat, such as the air spaces which exist in the grooves 46.

With the organization shown in Figs. 7 and 8, it is not necessary to employ an interposed ribbon of fiber glass or other equivalent insulation in order to obtain the cycling and heat control considered to be desirable as above set forth. Thus if the embodiment of the invention shown in Figs. 7 and 8 is utilized, there is eliminated the need for heat insulating matter separate from the thermostat and sole plate. Instead, the control of the heat which is transmitted to the thermostat is effected by the configuration given to the sole plate.

While I have shown, in the embodiment of Figs. 7 and 8, the sole plate as being provided with a special configuration or surface, and have shown the high-expansion member 39 as having a flat surface presented to the sole plate, these surfaces may be reversed to accomplish the same result. For example, the surface of the sole plate may be perfectly flat and smooth, and the surface of the high-expansion member 39 may be grooved or roughened until the desired controlled transfer of heat is effected.

Variations and modifications may be made within the scope of the claims and portions of the improvements may be used without others.

I claim:

1. In a flatiron, a sole plate; electric heating means carried by the sole plate; circuit-control means connected with the heating means; heat-responsive means actuating said circuit-control means, having an elongate outwardly-located high-expansion strip and a bowed, elongate low-expansion strip, said strips having their ends connected together; means mounting said heat-responsive means on the sole plate with the high-expansion strip disposed closely adjacent thereto; and abrasion-resistant heat-insulating means constituted of a material different from the sole plate and the high-expansion strip, interposed between and contacting said plate and strip and providing for predetermined controlled transfer of heat from the plate to the strip mainly by conduction, the material of said means being non-metallic and said heat transfer being governed by the thickness of said means and the insulating properties of the said non-metallic material of which it is composed.

2. In a flatiron, a sole plate; electric heating means carried by the sole plate; circuit-control means connected with the heating means; heat-responsive means actuating said circuit-control means, having an elongate outwardly-located high-expansion strip and an elongate, coextensive low-expansion strip secured at its ends to the high-expansion strip, said low-expansion strip being bowed and linked to the circuit-control means; means mounting said heat-responsive means on the sole plate with the high-expansion strip closely adjacent thereto; and solid heat-insulating means constituted of a material different from the sole plate and the high-expansion strip, interposed between and contacting said plate and strip and providing for predetermined controlled transfer of heat from the plate to the strip mainly by conduction, the material of said means being non-metallic and said heat transfer being governed by the thickness of said means and the insulating properties of the said non-metallic material of which it is composed.

3. In a flatiron, a sole plate; electric heating means carried by the sole plate; circuit-control means connected with the heating means; heat-responsive means actuating said circuit control means, having an outwardly-located high-expansion member and a low-expansion member connected therewith; means mounting said heat-responsive means on the sole plate with the high-expansion member disposed closely adjacent thereto; and heat-insulating means comprising glass fibers interposed between and contacting both the sole plate and the high-expansion member, providing for predetermined controlled transfer of heat from the plate to the member mainly by conduction, said heat transfer being governed by the thickness of the heat-insulating means.

4. In a flatiron, a sole plate; electric heating means carried by the sole plate; circuit-control means connected with the heating means; heat-responsive means actuating said circuit-control means, having an outwardly-located high-expansion member and a low-expansion member connected therewith; means mounting said heat-responsive means on the sole plate with the high-expansion member disposed closely adjacent thereto; and heat-insulating means comprising a flat strip of interwoven glass fibers interposed between and contacting both the sole plate and the high-expansion member, providing for predetermined controlled transfer of heat from the plate to the member mainly by conduction, said heat transfer being governed by the thickness of the heat-insulating means.

5. In a flatiron, a sole plate; electric heating means carried by the sole plate; circuit-control means connected with the heating means; heat-responsive means actuating said circuit-control means, having an outwardly-located high-expansion member and a low-expansion member connected therewith; means mounting said heat-responsive means on the sole plate with the high-expansion member disposed closely adjacent thereto; and heat-insulating means comprising a flat strip approximately .003" thick, formed of glass fibers interposed between and contacting both the sole plate and the high-expansion member, providing for predetermined controlled transfer of heat from the plate to the member mainly by conduction.

6. In a flatiron, a sole plate; electric heating means carried by the sole plate; circuit-control means connected with the heating means; heat-responsive means actuating said circuit-control means, having an outwardly-located, flat, high-expansion strip and a low-expansion strip secured at its ends to the high-expansion strip, said low-expansion strip being bowed and linked to the circuit-control means; means mounting said heat-responsive means on the sole plate with the high-expansion strip closely adjacent thereto; and heat-insulating means comprising a flat strip approximately .003" thick, formed of glass fibers, interposed between and contacting both the sole plate and the high-expansion strip and providing for predetermined controlled transfer of heat from the plate to the strip mainly by conduction, said heat transfer being governed mainly by said heat-insulating means.

7. In a flatiron, a sole plate; electric heating means carried by the sole plate; circuit-control means connected with the heating means; heat-responsive means actuating said circuit-control means, including an outwardly-located, flat, high-expansion member formed of material different from the sole plate and a low-expansion member, and including a frame secured to one end of the high-expansion member; means mounting said frame on the sole plate with the high-expansion member closely adjacent thereto whereby relative motion exists between the sole plate and high-expansion member in response to temperature changes; and heat-insulating means comprising interwoven glass fibers interposed between and contacting both the sole plate and the high-expansion member, providing for predetermined controlled transfer of heat from the plate to the member mainly by conduction, said heat transfer being governed by the thickness of the heat-insulating means and the material of which it is composed.

8. In a flatiron, a sole plate; electric heating means carried by the sole plate; circuit-control means connected with the heating means; heat-responsive means actuating said circuit-control means, having an outwardly-located elongate high-expansion member and a low-expansion member connected therewith; means attached to one end of the high-expansion member, mounting said heat-responsive means on the sole plate with the high-expansion member disposed closely adjacent thereto; and heat-insulating means comprising glass fibers interposed between and contacting both the sole plate and the high-expansion member, providing for predetermined controlled transfer of heat from the plate to the member mainly by conduction, said heat transfer being governed by the thickness of the heat-insulating means.

9. In a flatiron, a sole plate; electric heating means carried by the sole plate; heat-responsive means including a heat-expansible member disposed above and in close proximity to the sole plate; electric switch means disposed above the heat-responsive means, having a base rigidly secured to the sole plate, said base being provided with portions overlying and clamping said heat-expansible member against the sole plate; and means keying together the base of the switch means and the heat-expansible member, to prevent movement of the heat-responsive means relative to the switch means.

10. The invention as defined in claim 9, in which the heat-expansible member has slots in it, and in which the keying means comprises tongues projecting from the base of the switch means, extending into the slots of said member.

11. In a flatiron, a sole plate; electric heating means carried by the sole plate; circuit-control means connected with the heating means; heat-responsive means actuating said circuit-control means, having an outwardly located high-expansion member and a low-expansion member connected therewith; means mounting said heat-responsive means on the sole plate with the high-expansion member disposed closely adjacent thereto; and heat-transmitting means extending between the high-expansion member and the sole plate, having a plurality of disconnected areas of contact with said member and plate whereby a predetermined controlled transfer of heat is effected between the sole plate and the member.

12. The invention as defined in claim 11, in which the heat-transmitting means spaces the member from the sole plate, said space being occupied mainly by air.

13. In a flatiron, a sole plate; electric heating means carried by the sole plate; circuit-control means connected with the heating means; heat-responsive means for actuating said circuit-control means, having an outwardly located high-expansion member and a low-expansion member connected therewith; means mounting said seat-responsive means on the sole plate with the high-expansion member disposed closely adjacent thereto; and means providing for controlled transfer of heat between the sole plate and the high-expansion member at a rate less than that which would occur if the sole plate and member were in intimate physical contact with each other throughout most of their areas which face each other, said means including nonmetallic solid material at all times in contact with the sole plate, and with active portions of said member at points distributed over substantially the entire surface of the member facing the sole plate.

14. The invention as defined in claim 9, in which the means keying the base of the switch means to the heat-expansible member includes flanges on the member, engaging the said base.

References Cited in the file of this patent

UNITED STATES PATENTS

| Number | Name | Date |
|---|---|---|
| 1,391,296 | Benjamin | Sept. 20, 1921 |
| 1,537,035 | Heisler | May 5, 1925 |
| 2,248,666 | Fischer | July 8, 1941 |
| 2,370,146 | Clark | Feb. 27, 1945 |
| 2,389,686 | Reingruber et al. | Nov. 27, 1945 |
| 2,418,647 | Jordan | Apr. 8, 1947 |
| 2,446,284 | Ireland | Aug. 3, 1948 |
| 2,461,560 | McLelland et al. | Feb. 15, 1949 |
| 2,496,917 | Poitras | Feb. 7, 1950 |

FOREIGN PATENTS

| Number | Country | Date |
|---|---|---|
| 622,132 | Great Britain | Apr. 27, 1949 |